United States Patent
Albrecht et al.

(10) Patent No.: US 9,903,461 B2
(45) Date of Patent: Feb. 27, 2018

(54) PULLEY AND PULLEY DEVICE COMPRISING SUCH A PULLEY

(71) Applicants: Dirk Albrecht, Eschweiler (DE); Romuald Lescorail, Saint Cyr sur Loire (FR)

(72) Inventors: Dirk Albrecht, Eschweiler (DE); Romuald Lescorail, Saint Cyr sur Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 233 days.

(21) Appl. No.: 15/050,797

(22) Filed: Feb. 23, 2016

(65) Prior Publication Data
US 2016/0245389 A1    Aug. 25, 2016

(30) Foreign Application Priority Data
Feb. 23, 2015    (FR) ...................... 15 51528

(51) Int. Cl.
| F16H 55/36 | (2006.01) |
| F16H 55/40 | (2006.01) |
| F16C 13/00 | (2006.01) |
| F16C 35/067 | (2006.01) |
| F16C 19/06 | (2006.01) |

(52) U.S. Cl.
CPC .......... F16H 55/36 (2013.01); F16C 13/006 (2013.01); F16H 55/40 (2013.01); F16C 19/06 (2013.01); F16C 35/067 (2013.01); F16C 2361/63 (2013.01)

(58) Field of Classification Search
CPC .... F16H 55/36; F16H 55/40; Y10T 29/49453; Y10T 29/49826; B60B 2380/00
USPC .................................. 474/166, 195
See application file for complete search history.

(56) References Cited

U.S. PATENT DOCUMENTS

| 4,973,292 | A | * | 11/1990 | Mevissen | ............... F16H 55/36 |
| | | | | | 474/192 |
| 5,630,769 | A | * | 5/1997 | Schmidt | .................... B60B 5/02 |
| | | | | | 474/167 |
| 8,617,016 | B2 | * | 12/2013 | Dutil | ....................... F16H 55/36 |
| | | | | | 474/166 |
| 9,671,007 | B2 | * | 6/2017 | Dutil | ....................... F16H 55/36 |
| 2011/0300979 | A1 | * | 12/2011 | Dutil | ....................... F16H 55/36 |
| | | | | | 474/166 |
| 2014/0121050 | A1 | * | 5/2014 | Dutil | ....................... F16H 55/36 |
| | | | | | 474/195 |

FOREIGN PATENT DOCUMENTS

DE    3625800 A1    2/1988

* cited by examiner

Primary Examiner — Henry Y Liu
(74) Attorney, Agent, or Firm — Bryan Peckjian; SKF USA Inc. Patent Dept.

(57) ABSTRACT

A pulley intended to be mounted around a rolling bearing and having an inner web for connecting to an outer race of the rolling bearing, an outer web for connecting to a flexible force-transmitting element, and radial connecting ribs between the outer web and the inner web. The ribs are distributed in several groups, each group providing at least three successive ribs, which form several pairs of adjacent ribs, the midplanes of which are separated two by two at a regular angle, and the angle between the midplanes of two adjacent ribs in one and the same group varies, between two adjacent groups, by at least 5% with respect to the smaller of the two angles.

14 Claims, 3 Drawing Sheets

| A01 | A02 | A11 | A12 | A21 | A22 | A31 | A32 | A41 |
|-----|-----|-----|-----|-----|-----|-----|-----|-----|
| 15° | 15° | 11° | 11° | 14° | 14° | 11° | 11° | 15° |

| A42 | A51 | A52 | A61 | A62 | A71 | A72 | A81 | A82 |
|-----|-----|-----|-----|-----|-----|-----|-----|-----|
| 15° | 13° | 13° | 15° | 15° | 12° | 12° | 16° | 16° |

| A91 | A92 | A93 | A101 | A102 | A111 | A112 | A121 | A122 |
|-----|-----|-----|------|------|------|------|------|------|
| 14° | 14° | 14° | 12°  | 12°  | 11°  | 11°  | 14°  | 14°  |

*Fig.4*

| A01 | A02 | A11 | A12 | A21 | A22 | A31 | A32 | A41 |
|-----|-----|-----|-----|-----|-----|-----|-----|-----|
| 14° | 14° | 14° | 14° | 14° | 14° | 12° | 12° | 12° |

| A42 | A51 | A52 | A61 | A62 | A71 | A72 | A81 | A82 |
|-----|-----|-----|-----|-----|-----|-----|-----|-----|
| 16° | 16° | 11° | 11° | 13° | 13° | 13° | 15° | 15° |

| A91 | A92 | A93 | A101 | A102 | A111 | A112 | A121 | A122 |
|-----|-----|-----|------|------|------|------|------|------|
| 15° | 14° | 14° | 14°  | 14°  | 12°  | 12°  | 11°  | 11°  |

*Fig.5*

PULLEY AND PULLEY DEVICE COMPRISING SUCH A PULLEY

CROSS REFERENCE TO RELATED APPLICATION

This is a Non-Provisional Patent Application, filed under the Paris Convention, claiming the benefit of French (FR) Patent Application Number 1551528, filed on 23 Feb. 2015, which is incorporated herein by reference in its entirety.

TECHNICAL FIELD OF THE INVENTION

The invention relates to a pulley and to a pulley device comprising a rolling-element bearing about which such a pulley is mounted.

BACKGROUND OF THE INVENTION

In pulley-belt systems, it is known practice to use a rolling-element bearing to guide the movement of a pulley that is driven in rotation by a belt. Such a pulley comprises an inner web for connecting to an outer rolling-bearing race and an outer web which cooperates with the belt. Radial ribs connect the inner web to the outer web in order to stiffen the assembly. In conventional pulleys, these ribs are distributed at a regular angle around a rotation axis of the pulley. However, this can result in significant vibration when the pulley goes into resonance that is to say at certain particular speeds. Therefore, this type of pulley is not suitable for an automotive application since the emission of noise in the passenger compartment is a source of discomfort for the passengers.

U.S. Pat. No. 5,630,769 discloses what is referred to as a low-noise pulley, in which the ribs are distributed irregularly around the rotation axis of the pulley.

Moreover, US-A-2011/030 09 79 likewise discloses what is referred to as a low-noise pulley, comprising two sets of ribs which are disposed on either side of a midplane of the pulley. This midplane is orthogonal to a rotation axis of the pulley. The first and second sets of ribs have the same number of ribs. In addition, the ribs of the first and second sets are distributed at a regular angle around the rotation axis of the pulley. Finally, the ribs of the first set are angularly offset with respect to the ribs of the second set.

The angular distribution of the ribs of the pulley in U.S. Pat. No. 5,630,769 or in US-A-2011/030 09 79 does not make it possible to reduce the level of noise generated during operation below an acceptable threshold.

It is these drawbacks that the invention is intended more particularly to remedy by proposing a pulley for further reducing the noise associated with operation.

To this end, the invention relates to a pulley intended to be mounted around a rolling bearing, this pulley comprising an inner web for connecting to an outer race of the rolling bearing, an outer web for connecting to a flexible force-transmitting element, and radial connecting ribs between the outer web and the inner web. According to the invention, the ribs are distributed in several groups, each group comprising at least three successive ribs, which form several pairs of adjacent ribs, the midplanes of which are separated two by two at a regular angle within the group, and the angle between the midplanes of two adjacent ribs in one and the same group varies, between two adjacent groups, by at least 5% with respect to the smaller of the two angles.

By virtue of the invention, the particular distribution of the ribs causes the pulley to vibrate less at certain particular speeds, such as the resonance speed. The noise generated by the pulley is thus acceptable, and so the pulley can be incorporated into a motor vehicle. Specifically, the noise then generated inside the passenger compartment does not bother the passengers.

SUMMARY OF THE INVENTION

According to advantageous but non-obligatory aspects of the invention, such a pulley may include one or more of the following features, in any technically permissible combination:

Each group of successive ribs comprises a number of ribs that is less than one quarter of the total number of ribs of the pulley.

The inner web comprises means for connecting to the outer race of the rolling bearing.

The connecting means are teeth designed to pass into grooves provided in the outer surface of the outer race of the rolling bearing.

The pulley comprises between 15 and 50 ribs, in particular 27 ribs.

The ribs are distributed in 13 groups.

Among the 13 groups, 12 groups each comprise three successive ribs and one group comprises four successive ribs, it being understood that one rib is shared between each pair of two adjacent groups.

The sum of the angles formed between the midplanes of each pair of two adjacent ribs is equal to 360°.

Each rib has a clearance angle of less than 0.5°.

Two sets of identical ribs are disposed on either side of a midplane of the pulley.

The ribs of a first set on one side of a midplane of the pulley are angularly offset with respect to the ribs of a second set on the other side of the midplane of the pulley. The angular offset between the ribs of the first and second series on either side of the midplane of the pulley does not exceed 50% of the greatest angle value between two adjacent ribs.

The two sets of identical ribs are disposed symmetrically on either side of the midplane of the pulley.

The two sets of ribs disposed on either side of the midplane of the pulley are inverted with respect to one another, i.e. they define the same sequence of angular offsets between adjacent ribs starting in each case from a reference rib, a first set on one side of the midplane developing said sequence in the clockwise direction and the second set on the other side of the midplane developing it in the counterclockwise direction.

The reference ribs of the inverted sets of ribs are positioned symmetrically on either side of said midplane.

The reference ribs of the inverted sets of ribs are positioned with an angular offset on either side of said midplane. Preferably, the angular offset does not exceed 50% of the greatest angle value between two adjacent ribs.

Said ribs are disposed on one side of a midplane of the pulley, while further ribs are disposed on the other side of the midplane. The invention also relates to a pulley device, comprising a rolling bearing about which a pulley as defined above is mounted.

BRIEF DESCRIPTION OF THE DRAWINGS

The invention and further advantages thereof will become more clearly apparent in the light of the following description of an embodiment of a pulley according to the principle of the invention, this description being given with reference to the appended drawings, in which:

FIG. 4 is a table showing the angle values between the ribs connecting an outer web to an inner web of the pulley in FIGS. 1 to 3, and FIG. 5 is a table analogous to the one in FIG. 4, for a pulley variant that is not shown.

DETAILED DESCRIPTION OF THE INVENTION

Figure 1:
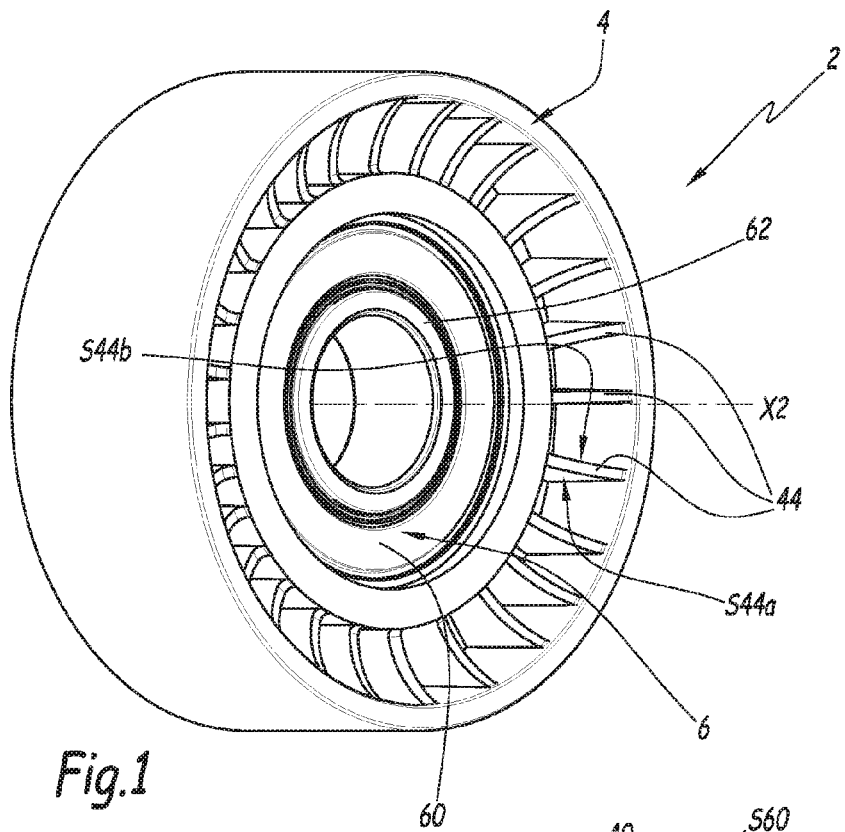
FIG. 1 is a perspective view of a pulley device in accordance with the invention, comprising a rolling bearing about which a pulley in accordance with the invention is mounted.
Figure 2:
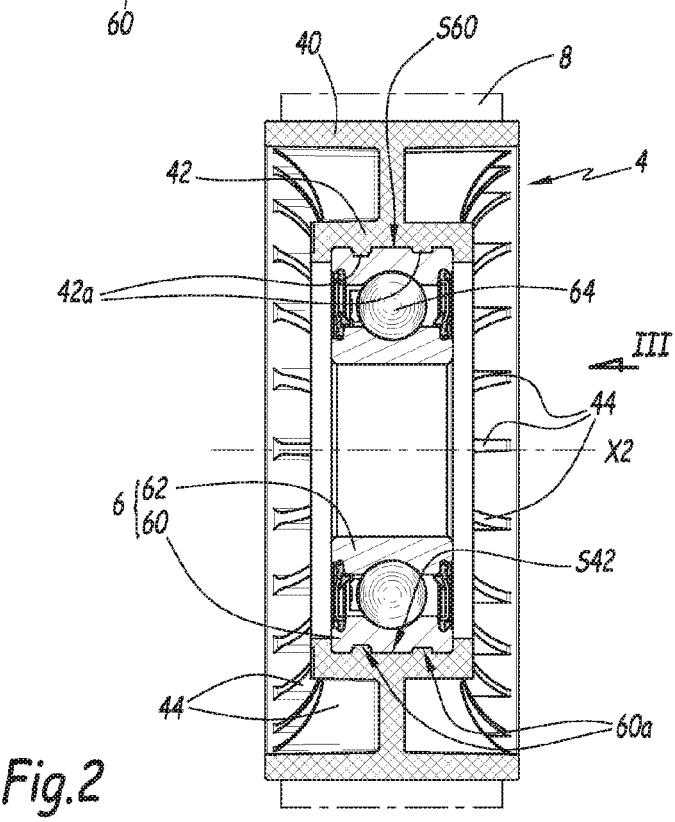
FIG. 2 is a longitudinal section through the device in FIG. 1.
Figure 3:
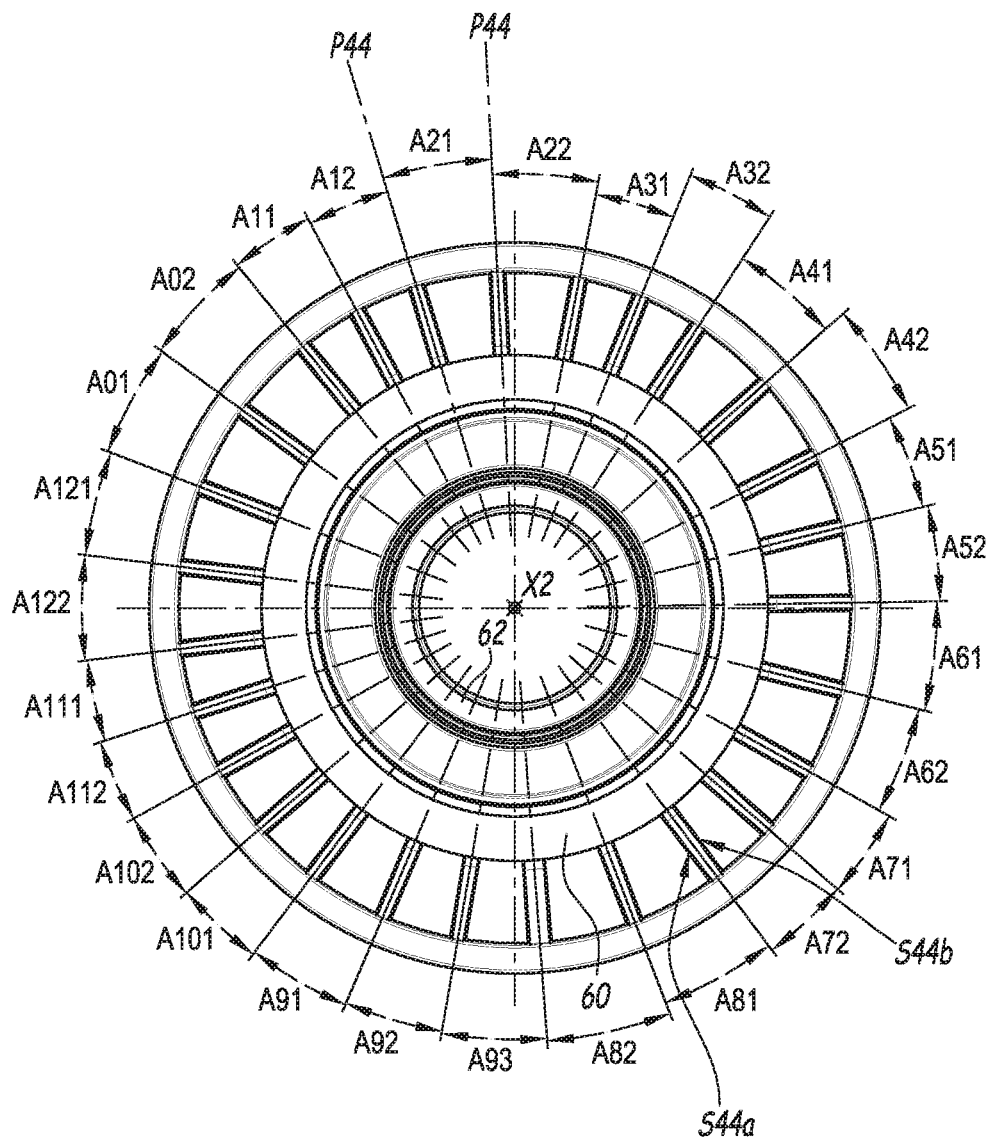
FIG. 3 is a view along the arrow III in FIG. 2.

FIGS. 1 to 3 show a pulley device 2 having a rolling bearing 6 about which a pulley 4 is mounted. X2 denotes a rotation axis of the device 2. The rolling bearing 6 is a rolling bearing having rolling bodies and includes an outer race 60 and an inner race 62 that are arranged coaxially with the axis X2. Rolling elements 64 are interposed between the races 60 and 62 of the rolling bearing 6. In the example, the rolling elements 64 are balls, but they may also be cylindrical rollers or needles. Alternatively, the rolling bearing 6 may also be a plain bearing.

The pulley 4 has a tubular shape overall centered on the axis X2. It further includes an outer web 40 with a tubular shape and an annular cross section. This web 40 is suitable for cooperating with a belt 8 shown by way of a dot-dashed line, only in FIG. 2. This belt 8 is a flexible force-transmitting element. Alternatively, some other type of flexible force-transmitting element can be used, in particular a rope, a chain or a strap.

The pulley 4 likewise comprises an inner web 42 for connecting to the outer race 60 of the rolling-element bearing 6. To this end, the inner web 42 has an internal radial surface S42 equipped with teeth 42a which are inserted into corresponding grooves 60a formed in an external radial surface S60 of the outer race 60. In this way, the pulley 4 rotates as one with the outer race 60 of the rolling bearing 6 about the rotation axis X2 of the device 2. In other words, the rotation axes of the pulley 4 and of the rolling bearing 6 are superposed and are coincident with the rotation axis X2 of the device 2. The inner web 42 is disposed coaxially inside the outer web 40. The inner web 42 is likewise tubular with an annular cross section.

Stiffening ribs 44 connect the inner web 42 to the outer web 40. These ribs 44 extend radially with respect to the rotation axis X2 of the device 2. They each have a clearance angle of less than 0.5°. The clearance angle of a rib 44 corresponds to the angle formed between two opposite walls S44a and S44b of the rib 44. These two walls S44a and S44b have a normal which is more or less orthoradial with respect to the axis X2. The distribution of the ribs 44 about the axis X2 is shown in detail with reference to FIGS. 3 to 5. As can be seen in these figures, the ribs 44 are distributed in several groups, each comprising at least three successive ribs which form several pairs of adjacent ribs, the midplanes P44 of which are separated two by two at a regular, in other words constant, angle AIJ within the group, that is to say that the angle AIJ is the same for each pair of two adjacent ribs in one and the same group. The midplane P44 of a rib 44 is substantially radial to the axis X2 and is disposed midway between the walls S44a and S44b of this rib 44. For clarity of the drawing, only two planes P44 are referenced in FIG. 3.

In the example shown in FIG. 3, the pulley 2 comprises 27 ribs 44 which thus delimit 27 angles between one another. The ribs 44 do not all have the same thickness but, in a variant that is not shown, they could all be identical.

For a given angle AIJ, where I and J are natural numbers, the index I denotes the group containing the two adjacent ribs between the midplanes of which the angle AIJ is defined, while the index J denotes the pair of adjacent ribs in question within the group. For example, the angle A01 corresponds to the angle defined between the midplanes of the first pair of adjacent ribs in group 0. The sum of the angles AIJ formed between the midplanes of each pair of two adjacent ribs 44 is equal to 360°.

In the example in FIG. 3, 13 groups of ribs 44 are distinguished. Among these 13 groups, 12 groups each comprise three successive ribs, while one group comprises four successive ribs. One rib 44 is shared between each pair of two adjacent groups.

Each group of successive ribs 44 comprises a number of ribs that is less than one quarter or than the integer part of one quarter of the total number of ribs 44 in the pulley 2. The angle between the midplanes P44 of two adjacent ribs 44 in one and the same group I varies, between two adjacent groups, by at least 5% with respect to the smaller of the two angles. For example, in the case of groups 0 and 1, the angle of group 1 is 11°, while the angle of group 0 is 15°. There is thus a variation of around 36% between the angle of group 1 and the angle of group 0.

An example of the angular distribution of the ribs 44 is given in the form of tables in FIGS. 4 and 5. These tables give the angle between each pair of two adjacent ribs. Of course, the angle values given in FIGS. 4 and 5 correspond to the specific case of a pulley having 27 ribs 44, but other angle values are conceivable, in particular for a pulley comprising a different number of ribs 44. The angular distribution given in FIG. 4 corresponds to the embodiment shown in FIGS. 1 to 3, while the angular distribution given in FIG. 5 corresponds to a variant that is not shown. In particular, in the angular distribution shown in FIG. 5, several groups of ribs 44 have more than three successive ribs.

The two angular distributions given by way of example are such that the pulley 2 vibrates less when it goes into resonance, and thus makes less noise.

In a variant that is not shown, the pulley 4 has a different number of ribs 44 than 27, for example between 15 and 50.

According to another variant that is not shown, two sets of identical ribs are disposed on either side of a midplane of the pulley 2. This midplane is a plane perpendicular to the axis X2, which intersects the pulley 2 in the middle. In addition, the ribs of a first set that are disposed on one side of the midplane of the pulley are angularly offset with respect to the ribs of a second set disposed on the other side of the midplane of the pulley. The angular offset between the ribs of the first and second sets on either side of the midplane of the pulley does not exceed 50% of the greatest value of the angle separating two adjacent ribs 44. The two sets of identical ribs can also be disposed symmetrically with respect to the midplane of the pulley.

According to another variant that is not shown and is applicable to a pulley comprising two sets of ribs that are disposed on either side of the midplane of the pulley, the two sets of ribs are inverted with respect to one another, that is to say that they define the same sequence of angular offsets between the adjacent ribs, each starting from a reference rib, but in an inverted manner. Thus, a first set of ribs disposed on one side of the midplane develops said sequence in the clockwise direction, while the second set on the other side of the midplane develops the same sequence in the counterclockwise direction. In this case, the reference ribs of the two inverted sets of ribs are positioned symmetrically on either side of said midplane. However, the reference ribs of the inverted sets of ribs can also be positioned with an angular offset on either side of said midplane. Preferably, the angular offset does not exceed 50% of the greatest angle value separating two adjacent ribs.

According to another variant that is not shown and is applicable to a pulley comprising two sets of ribs that are disposed on either side of the midplane of the pulley, one set of ribs that are disposed on one side of the midplane has a distribution in accordance with the invention, while the ribs of the other set of ribs are distributed in any desired way, for example regularly about the axis X2.

The features of the variants and embodiments that are envisioned above may be combined with one another to generate new embodiments of the invention.

The invention claimed is:

1. A pulley mounted around a rolling bearing, the pulley comprising:
    an inner web for connecting to an outer race of the rolling bearing,
    an outer web for connecting to a flexible force-transmitting element, and
    radial connecting ribs disposed between the outer web and the inner web, wherein:
    the ribs are distributed in several groups, each group having at least three successive ribs, which form several pairs of adjacent ribs, the midplanes of which are separated two by two at a regular angle (AIJ) within the group, and the angle between the midplanes of two adjacent ribs in one and the same group varies, between two adjacent groups, by at least 5% with respect to the smaller of the two angles.

2. The pulley as claimed in claim 1, wherein each group of successive ribs includes a number of ribs that is less than one quarter of the total number of ribs of the pulley.

3. The pulley as claimed in claim 1, wherein the inner web provides means for connecting to the outer race of the rolling bearing.

4. The pulley as claimed in claim 1, wherein the pulley provides between 15 and 50 ribs.

5. The pulley as claimed in claim 4, wherein the ribs are distributed in 13 groups.

6. The pulley as claimed in claim 5, wherein, among the 13 groups, 12 groups each provide three successive ribs and one group comprises four successive ribs, wherein one rib is shared between each pair of two adjacent groups.

7. The pulley as claimed in claim 1, wherein the sum of the angles (AIJ) formed between the midplanes (P44) of each pair of two adjacent ribs is equal to 360°.

8. The pulley as claimed in claim 1, wherein two sets of identical ribs are disposed on either side of a midplane of the pulley.

9. The pulley as claimed in claim 8, wherein the ribs of a first set on one side of the midplane of the pulley are angularly offset with respect to the ribs of a second set on the other side of the midplane of the pulley.

10. The pulley as claimed in claim 8, wherein the two sets of identical ribs are disposed symmetrically on either side of the midplane of the pulley.

11. The pulley as claimed in one of claim 1, wherein two sets of ribs are disposed on either side of a midplane of the pulley in an inverted manner with respect to one another.

12. The pulley as claimed in one of claim 1, wherein said ribs are disposed on one side of a midplane of the pulley and wherein further ribs are disposed on the other side of the midplane.

13. A pulley device, comprising:
    a rolling bearing about which a pulley is mounted, wherein the pulley includes;
    an inner web for connecting to an outer race of the rolling bearing,
    an outer web for connecting to a flexible force-transmitting element, and
    radial connecting ribs disposed between the outer web and the inner web, wherein:
    the ribs are distributed in several groups, each group having at least three successive ribs, which form several pairs of adjacent ribs, the midplanes of which are separated two by two at a regular angle (AIJ) within the group, and
    the angle between the midplanes of two adjacent ribs in one and the same group varies, between two adjacent groups, by at least 5% with respect to the smaller of the two angles.

14. The pulley as claimed in claim 1, wherein the pulley provides 27 ribs.

* * * * *